United States Patent
Bonnaud et al.

(10) Patent No.: US 7,458,595 B2
(45) Date of Patent: Dec. 2, 2008

(54) FAIRING FOR WHEEL OF HEAVY GOODS VEHICLE, AND THE CORRESPONDING HEAVY GOODS VEHICLE

(75) Inventors: Bernard Bonnaud, Courlay (FR); Bruno Cornuault, Saint Sauveur (FR)

(73) Assignee: Irisbus France S.A., Venissieux (FR)

( * ) Notice: Subject to any disclaimer, the term of this patent is extended or adjusted under 35 U.S.C. 154(b) by 135 days.

(21) Appl. No.: 11/326,669

(22) Filed: Jan. 6, 2006

(65) Prior Publication Data

US 2006/0157952 A1    Jul. 20, 2006

(30) Foreign Application Priority Data

Jan. 12, 2005   (FR)   ................................ 05 00311

(51) Int. Cl.
 *B62D 25/16*   (2006.01)
(52) U.S. Cl. ..................... 280/160; 280/849; 296/198
(58) Field of Classification Search .............. 280/160, 280/160.1, 849, 851, 848; 296/198
See application file for complete search history.

(56) References Cited

U.S. PATENT DOCUMENTS

| | | | | | |
|---|---|---|---|---|---|
| 1,401,088 | A | * | 12/1921 | Lee | 280/160 |
| 2,010,350 | A | * | 8/1935 | Davis | 280/849 |
| 2,059,305 | A | * | 11/1936 | Best | 280/848 |
| 2,124,790 | A | * | 7/1938 | Lyon | 280/848 |
| 2,157,793 | A | * | 5/1939 | Lang | 280/848 |
| 2,157,921 | A | * | 5/1939 | Schatzman | 292/241 |
| 2,161,161 | A | * | 6/1939 | Harroun | 292/26 |
| 2,217,046 | A | * | 10/1940 | Fergueson | 292/86 |
| 2,238,948 | A | * | 4/1941 | Schatzman | 280/848 |
| 2,257,556 | A | * | 9/1941 | Webb | 280/848 |
| 2,261,376 | A | * | 11/1941 | Jandus | 280/848 |
| 2,274,134 | A | * | 2/1942 | Fergueson et al. | 280/850 |
| 2,288,725 | A | * | 7/1942 | Lyon | 280/848 |
| 2,349,421 | A | * | 5/1944 | Green | 280/849 |
| 2,427,160 | A | * | 9/1947 | Reynolds | 280/847 |
| 2,460,349 | A | * | 2/1949 | Hessler | 280/848 |
| 2,474,852 | A | * | 7/1949 | Lyon | 280/848 |
| 2,577,673 | A | * | 12/1951 | Bookman | 280/849 |
| 2,605,119 | A | * | 7/1952 | Earnest | 280/849 |
| 2,606,773 | A | * | 8/1952 | Schatzman | 280/848 |
| 2,611,628 | A | * | 9/1952 | Schatzman | 280/848 |
| 2,634,138 | A | * | 4/1953 | Zabel | 280/849 |
| 2,811,373 | A | * | 10/1957 | Schatzman | 280/848 |
| 2,866,652 | A | * | 12/1958 | Schatzman | 280/848 |
| 3,584,898 | A | * | 6/1971 | Pearson et al. | 280/848 |

(Continued)

FOREIGN PATENT DOCUMENTS

BE    380193    6/1931

(Continued)

*Primary Examiner*—Jeffrey J Restifo
(74) *Attorney, Agent, or Firm*—Stetina Brunda Garred & Brucker

(57) ABSTRACT

This fairing comprises a cowl (14) and means (26, 42) for connecting said fairing to the vehicle body (16),said connecting means are designed to allow the release of the fairing from the vehicle body, according to a release movement, when said fairing is subjected to a force exceeding a preset value, in particular when the tyre of said wheel bursts, and said fairing also includes means that enable it to be retained to vehicle body (16) during said release movement, to prevent said fairing from forming projectile material.

12 Claims, 5 Drawing Sheets

U.S. PATENT DOCUMENTS

| | | | | |
|---|---|---|---|---|
| 3,784,226 A | * | 1/1974 | Wilfert et al. | 280/157 |
| 3,866,943 A | * | 2/1975 | Innis | 280/851 |
| 4,817,976 A | * | 4/1989 | Kingsley | 280/154 |
| 5,462,324 A | | 10/1995 | Bowen et al. | |
| 6,007,102 A | * | 12/1999 | Helmus | 280/849 |
| 6,276,746 B1 | * | 8/2001 | Gentry et al. | 296/180.1 |
| 6,382,675 B1 | * | 5/2002 | Furuse et al. | 280/847 |
| 2004/0080185 A1 | * | 4/2004 | Loddo | 296/198 |

FOREIGN PATENT DOCUMENTS

| | | |
|---|---|---|
| DE | 4339112 | 10/1994 |
| JP | 04176784 | 6/1992 |

* cited by examiner

FAIRING FOR WHEEL OF HEAVY GOODS VEHICLE, AND THE CORRESPONDING HEAVY GOODS VEHICLE

BACKGROUD

1. Field of the Invention

This invention relates to a fairing for the wheels of a heavy goods vehicle, and a vehicle fitted with at least one such fairing.

According to the invention, "heavy goods vehicle" means a vehicle whose total weight exceeds 3.5 tonnes. This generic term refers, by way of example but not of limitation, to buses, coaches, trucks and trailers.

2. Description of the Prior Art

Conventionally, such a heavy goods vehicle has at least one axle with at least one pair of fixed wheels, namely wheels which are not liable to steer. Buses, coaches and trucks also have a front axle fitted with drive wheels. The invention relates in particular to a fairing designed to equip a fixed wheel as defined above.

In operation, such a fairing extends to the vicinity of the side of the wheel so as to cover it at least partly. Its purpose is to improve the appearance of the vehicle, by giving continuity to the lines of the body. Moreover, this fairing considerably reduces the rain and mud splashes thrown up when the vehicle is driven on wet roads, which are particularly large in the case of heavy goods vehicles.

The different types of fairing for fixed wheels, developed according to the state of the art, are based on a main body in the shape of a cowl connected to the body of the vehicle. However, these known solutions present the drawback that they take no account of the risks that all or part of the fairing will form projectile material if the tire of this fixed wheel should burst.

The inflation pressure of a heavy goods vehicle tire may be as much as 9 bars, and if it bursts, the volume of air released is particularly large because of the size of the tire. Consequently, the fairing is liable to become detached when the tire bursts, forming projectile material which is liable to cause damage and/or injury.

BRIEF SUMMARY

That being said, the present invention offers a fairing for the wheels of a heavy goods vehicle which remedies the drawbacks of the prior art listed above.

For this purpose, it relates to a, fairing for the wheels of a heavy goods vehicle, especially a coach, bus, truck or trailer, said fairing extending laterally to the vicinity of the wheel during operation, so as to at least partly cover one side of said wheel, also comprising a cowl and means for connecting said fairing to a body of said vehicle, said connecting means being designed to allow the release of the fairing from the vehicle body, according to a release movement, when said fairing is subjected to a force exceeding a preset value, in particular when the tire of said wheel bursts, and said fairing also including means that enable it to be retained to the vehicle body during said release movement, to prevent said fairing from forming projectile material.

According to other characteristics of the invention:

the connecting means comprise at least one coupling designed to cooperate with at least one complementary coupling with which the vehicle body is fitted, and means for the support of the or each coupling, said support means comprising a first part integral with said coupling and a second part integral with the cowl, and said first and second parts being liable to separate from one another if the fairing is subjected to said force which exceeds a preset value;

the first and second parts are separated from one another by zones of least resistance;

the support means comprise a supporting part with an omega shape, which includes two wings integral with the cowl, and a core with two lines of least resistance which define a median area liable to become detached from the rest of the supporting part;

the median zone is integral with a connecting flap, on which the coupling is fitted;

the release movement is a pivoting movement;

the retention means comprise at least one pin, integral with the cowl, around which the pivoting movement takes place during operation, the or each pin being designed to cooperate with a seating in the vehicle body;

the or each pin extends from a lower metal beam connected to the cowl;

the cowl is at least partly made of composite material;

the outer part of the cowl is made of fibreglass-reinforced vinyl ester resin, and the inner part is made of fabrics consisting of aramid fibres blended with fibreglass.

The invention also relates to a heavy goods vehicle, especially a coach, bus, truck or trailer, comprising a body, at least one axle with at least two wheels, and at least one fairing extending laterally to the vicinity of the or each wheel, in order to cover one side of said wheel at least partly, characterised in that the or each fairing is as defined above.

According to other characteristics of the invention:

the body of said vehicle includes at least one complementary coupling designed to cooperate with the or each coupling of the fairing;

the coupling part of the fairing is a bolt, while the complementary coupling part of the vehicle body is a strike plate;

the vehicle body includes at least one seating designed to receive the or each pin of the fairing in a pivoting manner;

the or each seating contains at least one groove designed to receive the pin, one end of said groove being globally directed towards the outside of the fairing, to prevent its premature separation from the vehicle body, when the or each pin pivots in a corresponding groove;

the vehicle body is fitted with at least one complementary part which retains the fairing to the vehicle body during the release movement;

the or each complementary retention part is a cable, one end of which is integral with the vehicle body, while the other end thereof is integral with a cord with which the fairing is fitted.

BRIEF DESCRIPTION OF THE DRAWINGS

The invention will be better understood, and other advantages thereof will appear more clearly, from the following description of a fairing for the wheels of a heavy goods vehicle conforming to its principle, which said description is given solely by way of example but not of limitation, by reference to the annexed drawings, wherein.

DETAILED DESCRIPTION

Figure 1:
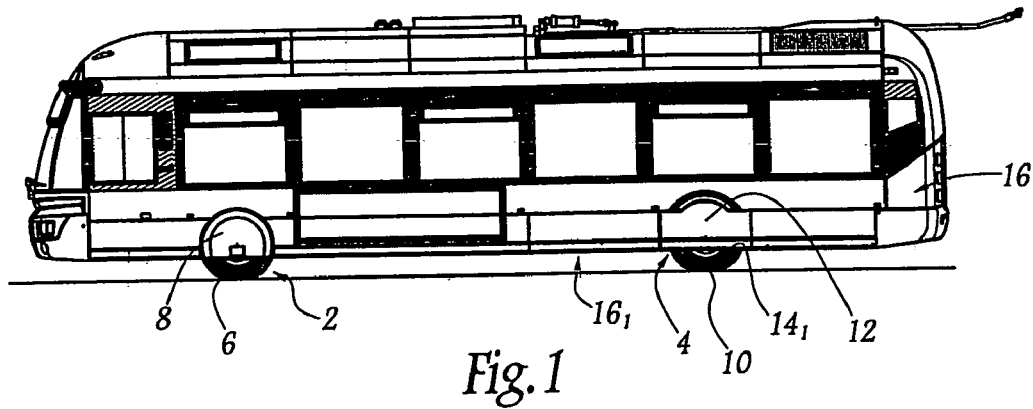
FIG. 1 is a side view of a heavy goods vehicle according to the invention.

FIG. 1 shows a heavy goods vehicle according to the invention, specifically a bus. The vehicle is fitted, in the conventional manner, with a front axle 2 and a rear axle 4. Front axle 2 is fitted with two drive wheels, of which only no. 6 is illustrated, and each of said drive wheels is associated with a fairing, of which only no. 8 is illustrated in FIG. 1.

Moreover, rear axle 4 is fitted with at least two non-drive wheels, which are therefore not liable to steer, of which only no. 10 is shown in FIG. 1. Each rear wheel is associated with a corresponding fairing, of which only no. 12 is shown in FIG. 1.

Figure 2:
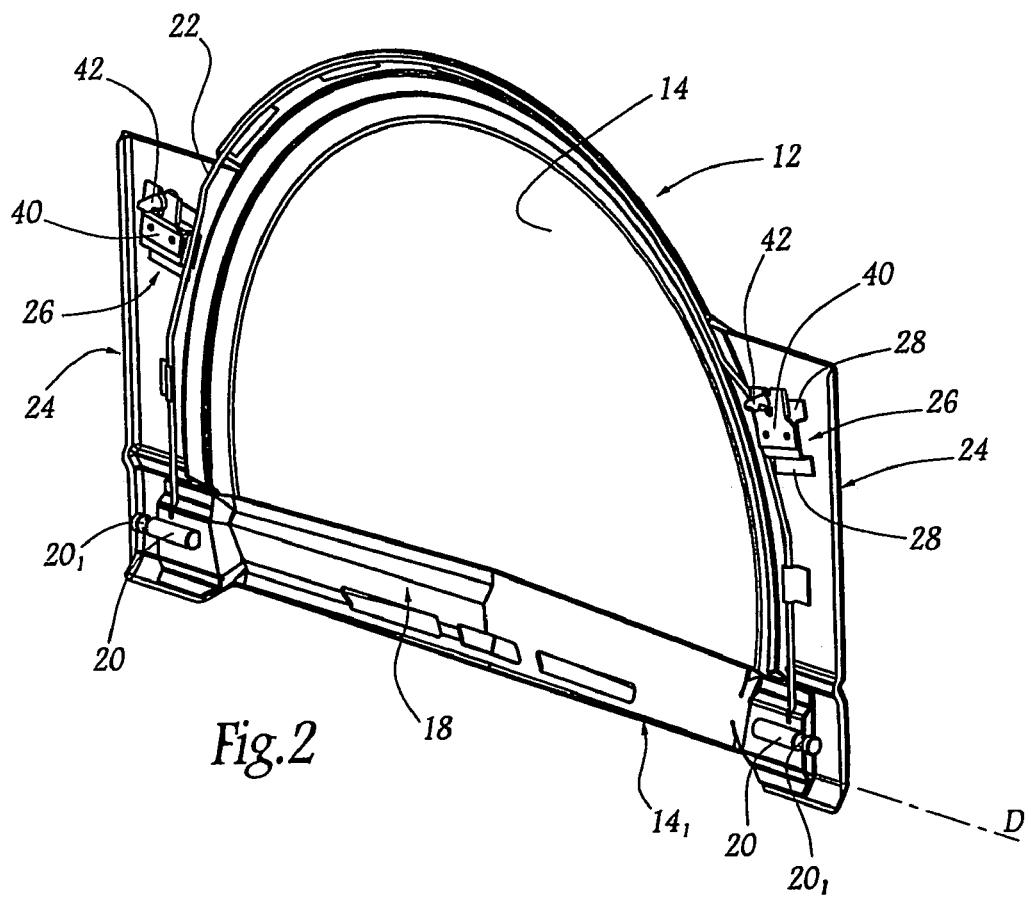
FIG. 2 is a perspective view of a fairing belonging to the vehicle shown in FIG. 1.

FIG. 2 more precisely illustrates said fairing 12 equipping a fixed wheel 10 of the heavy goods vehicle.

Said fairing 12 primarily comprises a main body 14, which forms a cowl. Said cowl has a disc shape truncated by a straight line D, which runs substantially parallel to the road. As shown in FIG. 1, when fairing 12 is fitted, its lower end, namely portion $14_1$ of cowl 14 truncated by straight line D, is flush with the bottom $16_1$ of body 16 of the vehicle.

Cowl 14 is made of a composite material. By way of example but not of limitation, its external part, opposite to wheel 10, is formed by a fibreglass-reinforced vinyl ester resin, while its internal part is formed by fabrics consisting of aramid fibres blended with fibreglass.

In the vicinity of straight line D, fairing 12 features a metal beam 18, which is connected to the inside of cowl 14, namely adjacent to wheel 10. At its two lateral ends, said beam is fitted with a pin 20, which contains a peripheral groove $20_1$, allowing cooperation with the vehicle body, as will be seen below.

A cord 22 extends at the outer circumference of cowl 14, joining the two lateral ends of beam 18. The presence of said cord 22 confers increased rigidity on the fairing assembly, while allowing better distribution of stresses.

Cowl 14 is bordered by two lateral shelves 24, which extend over the majority of its height. Each shelf 24 receives a support 26, which primarily includes two wings 28 fixed to shelf 24 by any appropriate means. Said wings 28 could thus be glued or attached in any mechanical way.

Figure 5:
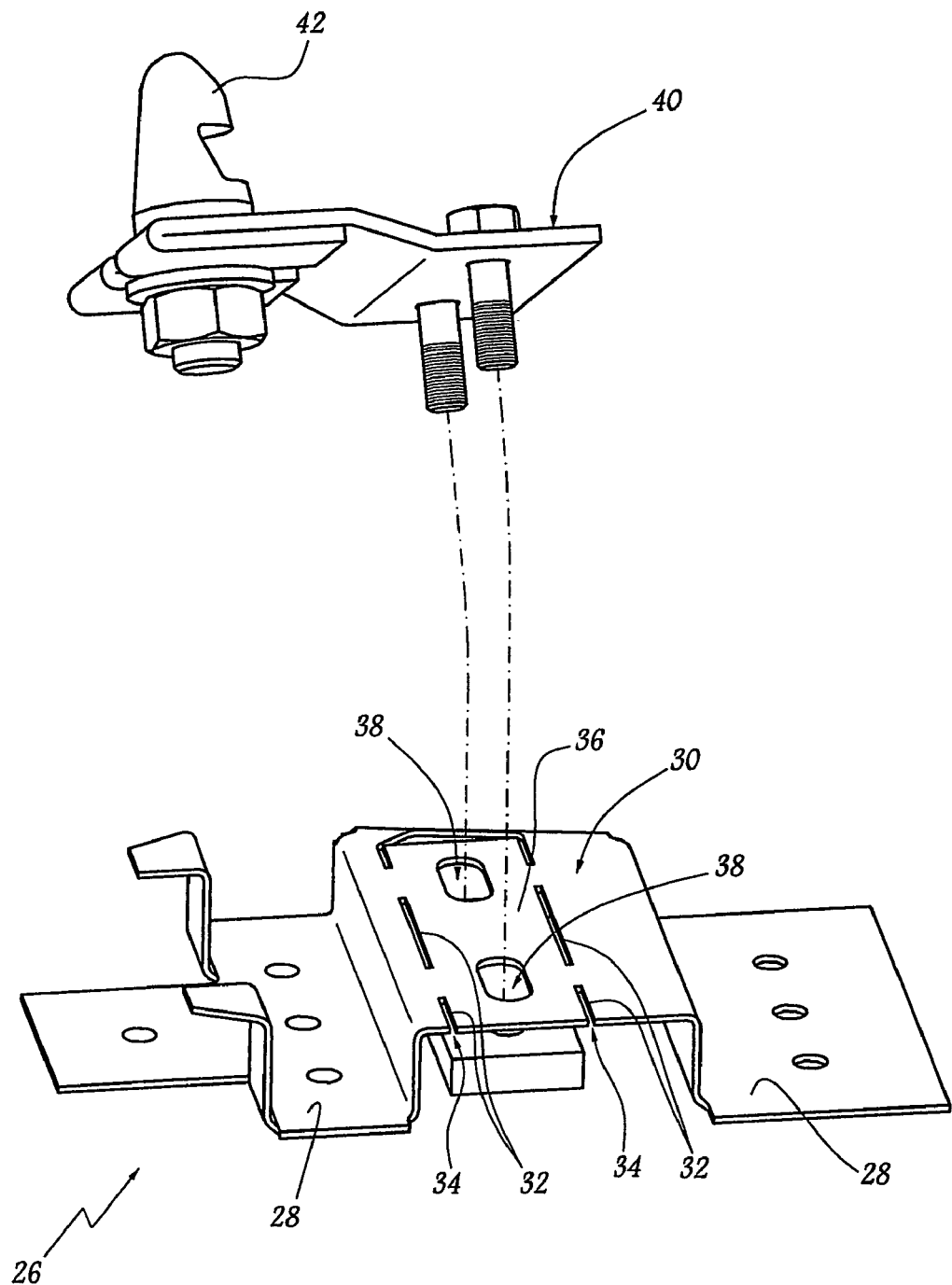
FIG. 5 is a perspective view on a larger scale showing couplings between the fairing and the body of the vehicle.

With particular reference to FIG. 5, support 26 also includes a central core 30, separated from the wings by corresponding shoulders, so that said core 30 extends at a distance from said wings 28. Notches 32 in core 30 define two lines of least resistance 34, which thus border a median zone 36, which is liable to become detached from the rest of core 30 during the application of a force of preset value. The value of said force depends, inter alia, on the size and number of notches 32.

Said median zone 36 contains two apertures 38, which allow connection of a flap 40, for example by screwing. Said flap receives a bolt 42, of a type known in itself, which can be operated from the outside of fairing 12.

Figure 3:
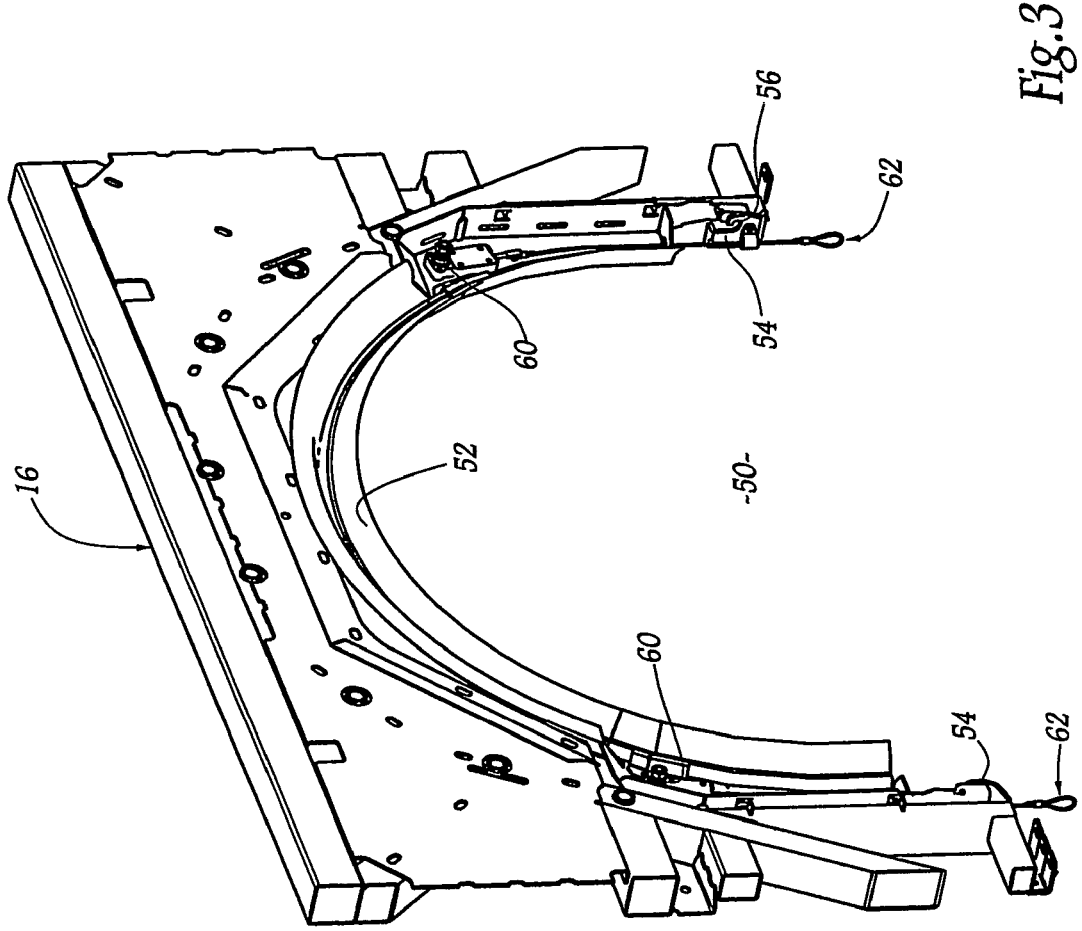
FIG. 3 is a perspective view of a part of the body of the vehicle shown in FIG. 1, designed to cooperate with the fairing shown in FIG. 2.

As shown in FIG. 3, body 16 of the heavy goods vehicle contains a substantially semicircular opening 50, designed to allow the passage of rear wheel 10 and fairing 12. The walls of said opening 50 are bordered by a peripheral joint 52, designed to cooperate in a known way with cowl 14.

At the two lower ends of opening 50, the walls of said opening present two seatings 54, each of which contains a recess 56. Said recess receives a corresponding pin 20, at the level of its groove $20_1$. The bottom of recess 56 is globally directed to the outside, so as to prevent the fairing from separating from the vehicle body, as will be seen below.

Figure 4:
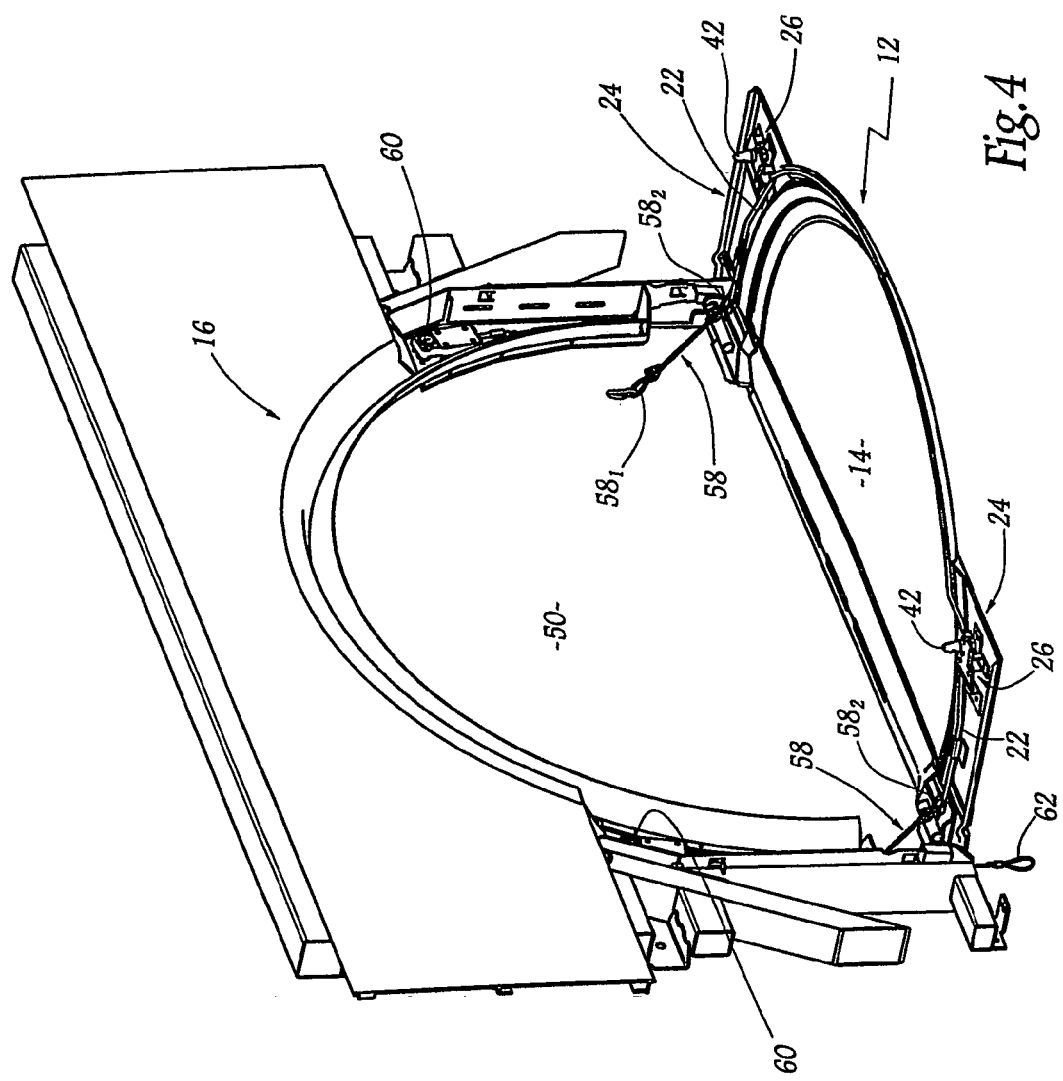
FIG. 4 is a perspective view of the fairing shown in FIG. 2, mounted on the vehicle body shown in FIG. 3.

Moreover, as shown in FIG. 4, vehicle body 16 supports two retaining cables 58, which are integral with said vehicle body at the level of a first end $58_1$ in the shape of a loop. The other end $58_2$ of said cables 58 also forms a loop, allowing them to be connected by being wound round cord 22. Vehicle body 16 is also fitted with two strike plates 60, each of which is designed to receive a corresponding bolt 42. Finally, in the vicinity of seatings 54, vehicle body 16 is fitted with two additional cables 62 (FIG. 3), which allow bolts 42 to be released in a manner known in itself.

The use of fairing 8, described above, will now be explained.

Figure 6:
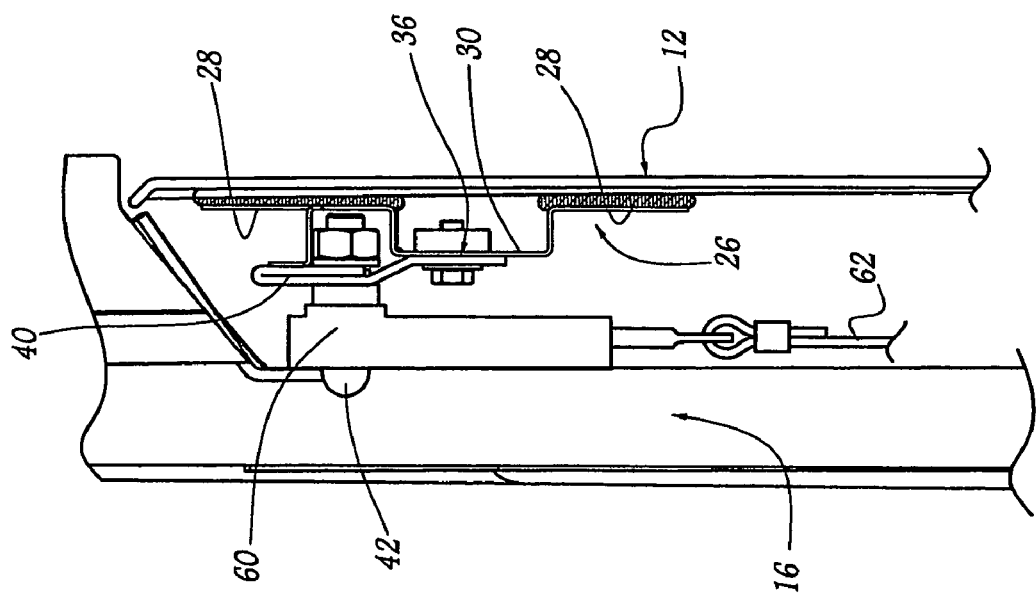
FIG. 6 is a side view on a larger scale showing the fitting of the fairing to the body of the vehicle.

In normal operation, each bolt 42 is bolted to a corresponding strike plate 60, in such a way as to ensure that fairing 12 and vehicle body 16 are firmly connected, as illustrated in FIG. 6. However, in this case, bolts 42 are easily accessible by the user as a result of the presence of cables 62. This allows rapid release of the fairing, especially during maintenance, by means of a traction action on said cables 62.

In this respect, FIG. 4 shows in more detail a situation in which the fairing is in the "open" position after such a manual release. In this embodiment, bolt 42 is integral with support 26, which is still in one piece, unlike the one shown in FIG. 7, as will be seen below.

If the tire of rear wheel 10 should burst, a lateral force directed towards the exterior of the vehicle body will be produced as a result of the corresponding shock wave. If this force exceeds the preset value mentioned above, lines of least resistance 34 will break. Consequently, median zone 36 will become detached from the rest of support 26.

Figure 7:
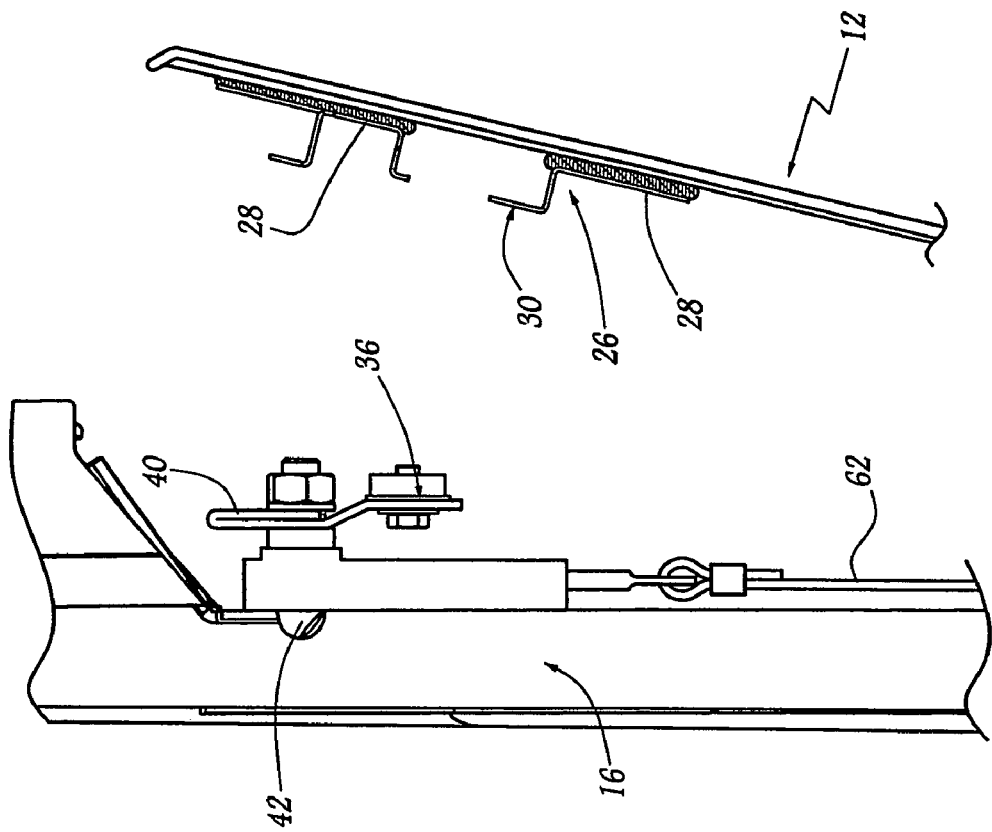
FIG. 7 is a side view, similar to FIG. 6, showing the detachment of the fairing from the body of the vehicle when a tire of the vehicle bursts.

As shown in FIG. 7, bolt 42, flap 40 and median zone 36, now detached, remain integral with the vehicle body 16 after the breakage of lines of least resistance 34. Conversely, most of support 26, with the exception of said zone 36, remains integral with fairing 12.

Said fairing can therefore be released from vehicle body 16 by pivoting towards the exterior around pins 20, which therefore retain fairing 12. This pivoting movement prevents lateral projection of all or part of the fairing, as it rests on the ground after said movement.

The shape of recesses 56 is advantageous, as it prevents pins 20 from exiting prematurely. In fact, when the fairing is subjected to the lateral force caused by the bursting of the tire, said pins 20 tend to be flattened against the bottom of said recesses 56.

Equally, the shape of said recesses 56 only allows removal by means of a dual pushing movement towards the inside, followed by lifting of the fairing assembly. By way of additional safety, cables 58 form other means of retaining the fairing to the vehicle body.

Moreover, the invention enables the energy released by the bursting of the tire to be absorbed. It should be noted in this respect that the quantity of aramid fibres with high elastic strength is calculated so that they absorb the energy released without tearing. Moreover, the fibreglass provides a satisfactory connection between the resin and the fabric, thus preventing delamination between the various reinforcements.

Consequently, despite the shock wave generated by the bursting of the tire, the fairing remains in one piece, and does not form projectile material.

The invention achieves the above-mentioned objectives.

As stated, it eliminates the risk that all or part of the fairing will form projectile material if a tire bursts.

Moreover, the invention improves passive security by protecting the movement of the wheel and preventing projectile material consisting of water and dirt particles from being thrown up, by means of the upper part of the wheel.

The fairing according to the invention can be rapidly connected to and disconnected from the body of the vehicle. This is advantageous, especially for the purpose of maintenance operations such as tire pressure checks and examination of the tire walls.

Finally, the fairing according to the invention is particularly light, as it contains little dead weight, and is therefore very easy to manipulate for maintenance purposes.

What is claimed is:

1. A fairing for wheels of a heavy goods vehicle, wherein said fairing extends laterally to the vicinity of wheel during operation, so as to at least partly cover one side of said wheel, wherein said fairing comprises:
    a cowl; and
    a connector of said fairing to the vehicle body, said connector being designed to allow the release of the fairing from the vehicle body, according to a release movement, when said fairing is subjected to a force exceeding a preset value, and wherein said fairing also includes a retainer to maintain attachment of the fairing to the vehicle, during said release movement when the fairing is subject to the force exceeding the preset value to prevent said fairing from forming projectile material;
    wherein said connector includes at least one coupling part designed to cooperate with at least one complementary coupling part with which vehicle body is fitted, and a support for at least one of the coupling part, said support means comprising a first part integral with said coupling part, and a second part integral with said cowl, said first and second parts being liable to become detached from one another if the fairing is subjected to said force exceeding the preset value, the first and second parts being separated from one another by zones of least resistance defined by at least one notch, the support comprising an omega-shaped support, which includes two wings integral with said cowl, and a core featuring two lines of least resistance, which define a median zone liable to become detached from the rest of support.

2. A fairing as claimed in claim 1, wherein the median zone is integral with a connecting flap, to which coupling is fitted.

3. A fairing as claimed in claim 1, wherein the release movement is a pivoting movement of the cowl laterally away from the vehicle.

4. A fairing as claimed in claim 3, wherein the retainer comprises at least one pin, integral with the cowl, around which the pivoting movement takes place during operation, the pin being designed to cooperate with a seating of vehicle body.

5. A fairing as claimed in claim 4, wherein the pin extends from a lower metal beam connected to said cowl.

6. A fairing as claimed in claim 1, wherein said cowl is made at least partly of composite material.

7. A fairing as claimed in claim 6, wherein the outer part of said cowl is made of a fibreglass-reinforced vinyl ester resin, and the inner part is made of fabrics consisting of aramid fibres blended with fibreglass.

8. A fairing as claimed in claim 1, wherein the preset value is associated with a bursting tire.

9. A vehicle for heavy goods, comprising a body, at least one axle with at least two wheels, and at least one fairing extending laterally to the vicinity of the wheel, in order to cover one side of said wheel at least partly, wherein the fairing comprises a cowl and a connector of said fairing to the vehicle body, said connector having coupling part fitted to the fairing and a complimentary coupling part fitted to the vehicle body, at least one of the coupling part or the complimentary coupling part having a support comprising a first part removeably attached to a second part, the first part remaining attached to the vehicle and the second part detaching from the first part and remaining attached to the cowl when the fairing is subjected to a force exceeding a preset value, movement of the fairing away from the vehicle body being in accordance with a release movement, and wherein said fairing includes a retainer of said fairing to vehicle body to prevent said fairing from forming projectile material during said release movement when said fairing is subjected to the force exceeding the preset value, the vehicle body is fitted with at least one complementary retention part which retains said fairing to said vehicle body during the release movement, wherein at least one of the complementary retention part is a cable, one end of which is integral with the vehicle body while the other end is integral with a cord, with which the fairing is fitted.

10. A vehicle for heavy goods as claimed in claim 9, wherein the coupling part of said fairing is a bolt, while the complementary coupling part of vehicle body is a strike plate.

11. A vehicle for heavy goods according to claim 9, wherein the release movement is a pivoting movement, the retainer comprises at least one pin, integral with the cowl, around which the pivoting movement takes place during operation, the vehicle body includes at least one seating designed to receive a respective pin of said fairing in a pivoting manner.

12. A vehicle for heavy goods as claimed in claim 11, wherein at least one of the seating contains at least one groove designed to receive a pin, one bottom of said groove being globally directed towards the outside of the fairing, to prevent premature detachment of the fairing from the vehicle body when the pin pivots in a corresponding groove.

* * * * *